US010615995B2

(12) United States Patent
Yu

(10) Patent No.: US 10,615,995 B2
(45) Date of Patent: Apr. 7, 2020

(54) SMART PANEL DEVICE AND METHOD

(71) Applicant: Chengfu Yu, Irvine, CA (US)

(72) Inventor: Chengfu Yu, Irvine, CA (US)

(*) Notice: Subject to any disclaimer, the term of this patent is extended or adjusted under 35 U.S.C. 154(b) by 0 days.

(21) Appl. No.: 15/888,425

(22) Filed: Feb. 5, 2018

(65) Prior Publication Data
US 2019/0245712 A1 Aug. 8, 2019

(51) Int. Cl.
H04L 12/28 (2006.01)
G06F 3/0488 (2013.01)
H04L 12/46 (2006.01)

(52) U.S. Cl.
CPC .......... H04L 12/282 (2013.01); G06F 3/0488 (2013.01); H04L 12/4625 (2013.01); H04L 2012/2841 (2013.01)

(58) Field of Classification Search
None
See application file for complete search history.

(56) References Cited

U.S. PATENT DOCUMENTS

| | | | |
|---|---|---|---|
| 5,086,385 A * | 2/1992 | Launey | G06F 3/04847 340/6.11 |
| 9,997,036 B2 * | 6/2018 | Scalisi | H04N 5/2257 |
| 2012/0068832 A1 * | 3/2012 | Feldstein | F16M 11/041 340/12.5 |
| 2015/0061859 A1 * | 3/2015 | Matsuoka | G08B 27/00 340/501 |
| 2015/0256665 A1 * | 9/2015 | Pera | H04L 12/2803 455/420 |
| 2016/0111878 A1 * | 4/2016 | Qureshi | H04R 27/00 307/39 |
| 2016/0139575 A1 * | 5/2016 | Funes | H04L 12/2834 700/275 |

* cited by examiner

Primary Examiner — Beau D Spratt
(74) Attorney, Agent, or Firm — Arman Khosraviani

(57) ABSTRACT

A smart panel device comprising at, least, one memory, at least one module, wherein the at least one module is detachably coupled to the smart panel device, and wherein the smart panel device is communicatively coupled to at least one building wiring, a processor, coupled to the at least one memory, the processor is configured to cause a first action upon detecting a first activity.

29 Claims, 5 Drawing Sheets

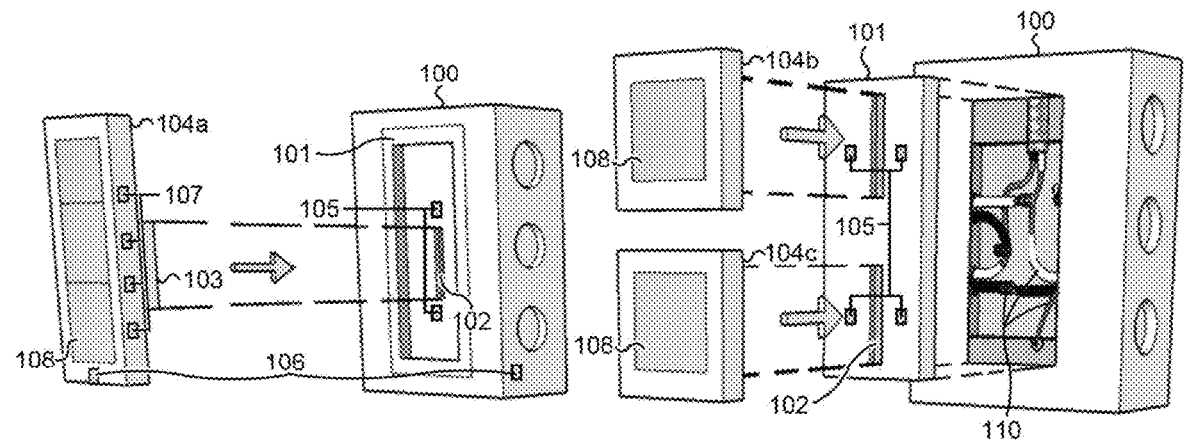
FIG. 1A  FIG. 1B
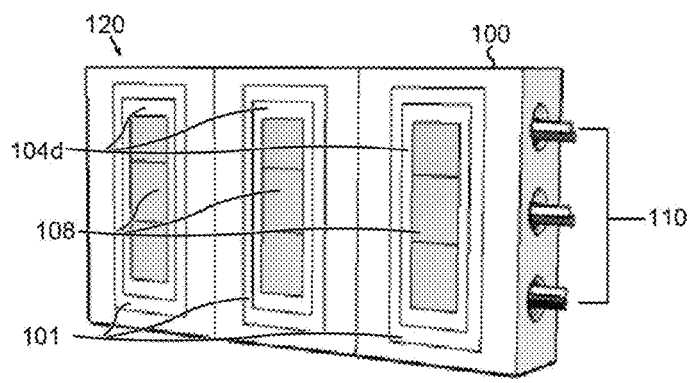 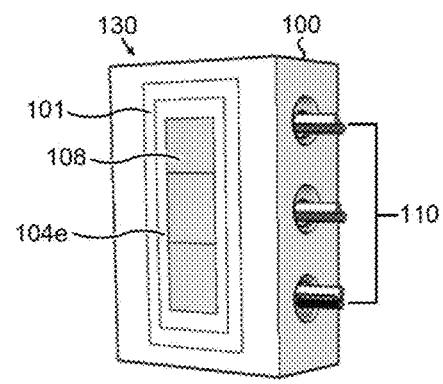
FIG. 1C  FIG. 1D
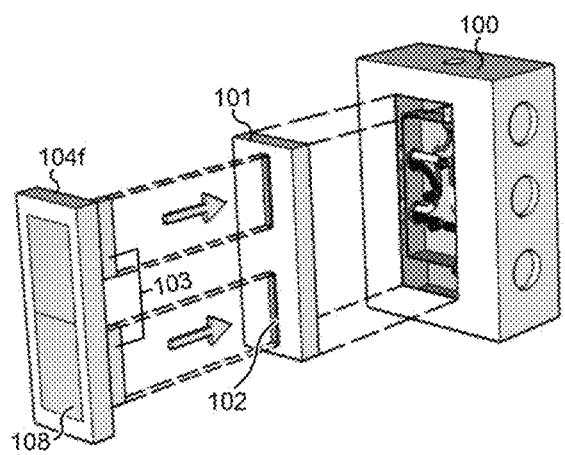 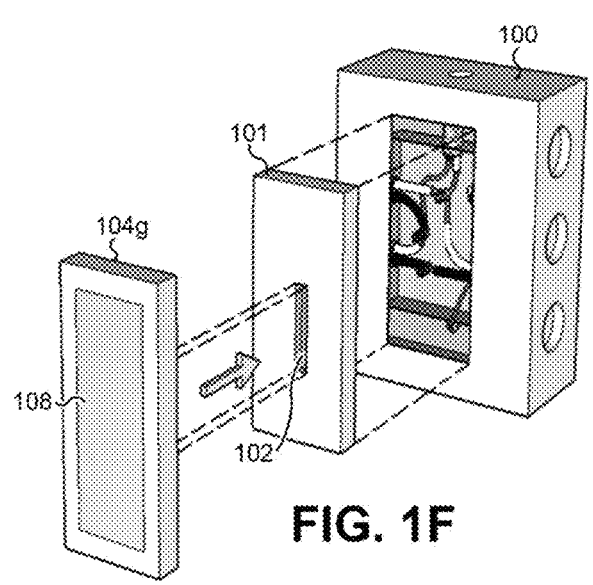
FIG. 1E  FIG. 1F

SMART PANEL DEVICE AND METHOD

CROSS-REFERENCE TO RELATED APPLICATIONS

The entire contents of the following applications are incorporated herein by reference: U.S. Nonprovisional patent application Ser. No. 15/386,670; filed on Dec. 21, 2016; and entitled AUTONOMOUS PAIRING OF INTERNET OF THINGS DEVICES. U.S. Nonprovisional patent application Ser. No. 15/454,446; filed on Mar. 9, 2017; and entitled DUAL VIDEO SIGNAL MONITORING AND MANAGEMENT OF A PERSONAL INTERNET PROTOCOL SURVEILLANCE CAMERA. Nonprovisional patent application Ser. No. 15/488,211 filed on Apr. 14, 2017; and entitled AN INTERACTIVE AUGMENTED-REALITY IoT DEVICES SYSTEMS AND METHODS. Nonprovisional patent application Ser. No. 15/490,826 filed on Apr. 18, 2017; and entitled GARAGE DOOR CONTROLLER AND MONITORING SYSTEM AND METHOD. Nonprovisional patent application Ser. No. 15/620,749 filed on Jun. 12, 2017; and entitled SMART REGISTER DEVICE AND METHOD. Nonprovisional patent application Ser. No. 15/625,601 filed on Jun. 16, 2017; and entitled SMART FAN AND VENTILATION DEVICE AND METHOD. Nonprovisional patent application Ser. No. 15/680,146 filed on Aug. 17, 2017; and entitled DETERMINING A COMMUNICATION LANGUAGE FOR INTERNET OF THINGS DEVICES. Nonprovisional patent application Ser. No. 15/703,718 filed on Jun. 5, 2017; and entitled AUTONOMOUS AND REMOTE PAIRING OF INTERNET OF THINGS DEVICES UTILIZING A CLOUD SERVICE II. Nonprovisional patent application Ser. No. 1,818,275 filed on Nov. 20, 2017; and entitled AUTOMATED SMART DOORBELL DEVICE AND METHOD. Nonprovisional patent application Ser. No. 15/835,985 filed on Dec. 8, 2017; and entitled AUTONOMOUS AND REMOTE PAIRING OF INTERNET OF THINGS DEVICES UTILIZING A CLOUD SERVICE.

FIELD

The present disclosure generally relates to controlling and monitoring electronic devices within a structure, and more particularly, to a user controllable device for monitoring, controlling, and communicating with smart home devices.

BACKGROUND

Many homes are connected through a router to a network of devices, a circuit panel delivers power throughout the home to power the router and keep these devices connected. The home network may include numerous wireless devices, smart home devices, TVs, thermostats, smoke detectors, security cameras, etc. However, many of these devices need a constant supply of power from an outlet in the home that may not be convenient or possible to install such a device. Furthermore, some light switch locations may provide a convenient installation location of such devices.

Power in many homes is supplied through electrical wiring running through the attic, garage, between walls, or under the home flooring. The electrical wiring runs to outlets, switches, and fixtures within the home. Conventional outlets and switches provide a simple function of powering plugged in devices or lighting. Therefore, modifying such outlets and switches may provide for an easy, efficient and cost-effective means of adding greater control and functionality to a home.

SUMMARY

The disclosed subject matter relates to a Smart Switch device and method. The Smart Switch device comprising at least one memory, at least one module, wherein the at least one module is detachably coupled to the smart panel device, and wherein the smart panel device is communicatively coupled to at least one building wiring, and a processor, coupled to the at least one memory, the processor is configured to cause a first action upon detecting a first activity. The smart panel device further comprising a network module coupling the smart panel device to a local area network, wherein the smart panel device is communicably coupled to and receives instruction from at least one of a remote computing device, a server, or one or more other smart panel devices. The smart panel device comprises of at least one connector for detachably coupling the at least one module to the smart panel device and configured to be attached to a wall box. The smart panel device further being communicably coupled to one or more electronic devices.

The at least one module of the smart panel device comprising a touch sensitive surface, wherein user interaction with the touch sensitive surface transmits a control signal to the one or more electronic devices. The user interaction with the touch sensitive surface of the at least one module operates at least one of a light bulb, lighting fixture, or outlet. The at least one module comprising of at least one interconnect port for coupling at least one of an interconnect cable, power cable, media cable, or an electronic device to the smart panel device. The smart panel device further comprises a voltage regulator/converter for providing a predetermined current and voltage to at least one of the interconnect port and the at least one module.

The at least one of the one or more sensors is integrated within the smart panel device. The processor of the smart panel device being configured to operate the one or more electronic devices based on instructions stored on the at least one memory. The smart panel device further comprising one or more sensor covers for covering the one or more sensors and wherein the one or more sensor covers are configured by the processor. The first action of the smart panel device comprising of collecting at least one of geolocation information, visual information, audio information, and environmental information. Following the first action the smart panel device may send a notification alert, the visual information, the audio information, and the environmental information to the remote computing device. A combination of facial recognition technology, voice recognition technology and an ability to adjust the sensitivity of the one or more sensors enables the smart panel device to discriminate between the presence of a human being and other living beings.

The at least one module is one of a video teleconferencing array module, system on a chip (SOC), Wi-Fi extender, thermostat, speaker, intercom, virtual assistant device, camera, motion sensor, temperature sensor, humidity sensor, or wind sensor, and wherein the one or more sensors acquire space information or individual information of a surrounding environment to enable image recognition technology, facial recognition technology, geolocation technology, or voice recognition technology.

The disclosed subject matter further relates to a method of detecting, by one or more sensors, an environmental condition, communicating the environmental condition to a smart panel device, and performing a first action, by the smart panel device, based on the detecting. The method including a first action comprising of operating at least one of a light bulb, ceiling fan, lighting fixture, or outlet. The first action further comprising attaching a device to the smart panel device, and providing a predetermined current and voltage to the attached device. The attached device being at least one of a cable coupled to an electronic device and a module communicably coupled to one or more electronic devices. The smart panel device is communicably coupled to one or more smart panel devices, and wherein environmental condition comprises of at least one of a temperature, humidity, smoke, CO, $CO_2$, air particulate, ambient light, motion, barometer, infrared, airflow or airspeed information, and wherein the first action comprises of acquiring the environmental condition by at least one of the one or more smart panel devices or the one or more electronic devices, from at least an interior environment or an exterior environment.

The method further comprising of comparing the environmental condition acquired by the one or more smart panel devices to user preferences stored in a database prior to performing the first action. A user is prompted to approve of operating the one or more electronic devices, wherein at least one of the one or more sensors is integrated within the smart panel device, and detecting the surrounding environment utilizes at least one of image recognition technology, facial recognition technology, geofencing technology, or voice recognition technology.

The first action further comprises of acquiring at least one of a space information and an individual information of a surrounding environment, wherein the individual information comprises of at least one of the following: size, build, temperature, and number of individuals in the space, and wherein the space information comprises of at least one of the following: furniture type and location, smart panel device installation location, status and location of windows and doors, openings and cavities in the surrounding environment.

The space information acquired by the one or more sensors is compared to a stored space information in a database. The method further comprising of storing the space information acquired by the one or more sensors in the database; wherein the database is stored on a server or an at least one memory of the smart panel device. Comparing the at least one of the space information to user preferences stored in the database prior. The space information in the database being updated with the space information acquired by the one or more sensors or one or more electronic devices, and wherein a user is prompted to approve updating of the database with the space information acquired by the one or more sensors.

It is understood that other configurations of the present disclosure will become readily apparent to those skilled in the art from the following detailed description, wherein various configurations of the present disclosure are shown and described by way of illustration. As will be realized, the present disclosure of other different configurations and its several details are capable of modifications in various other respects, all without departing from the subject technology. Accordingly, the drawings and the detailed description are to be regarded as illustrative in nature and not restrictive.

BRIEF DESCRIPTION OF THE DRAWINGS

Certain features of the present disclosure are set forth in the appended claims. However, for purpose of explanation, several implementations of the present disclosure are set forth in the following figures.

FIGS. 1A-1F illustrate an exemplary embodiment of a Smart Panel system.

Figure 2:
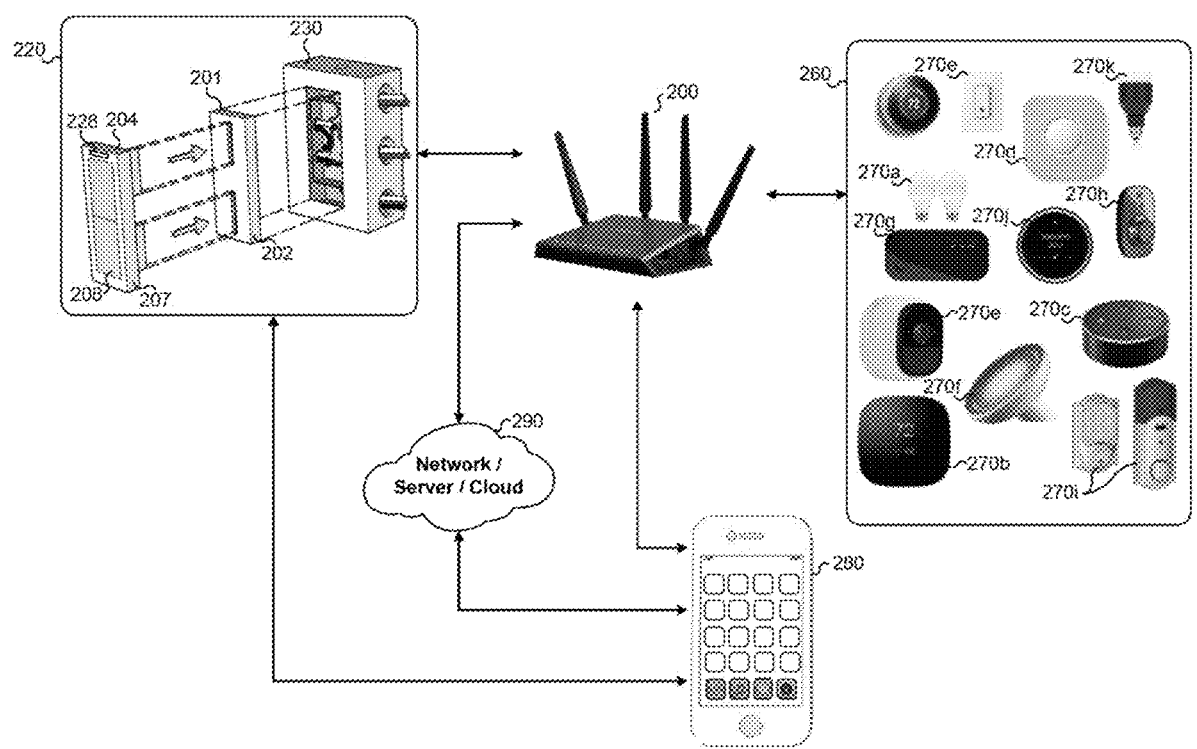
FIG. 2 illustrates an exemplary embodiment of the Smart Panel system FIGS. 1A-1F being implemented locally and remotely.

Embodiments of the present disclosure and their advantages are best understood by referring to the detailed description that follows. It should be appreciated that like-reference-numerals are used to identify like-elements illustrated in one or more of the figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Various features of the present disclosure will now be described, and is not intended to be limited to the embodiments shown herein. Modifications to these features and embodiments will be readily apparent to those skilled in the art, and the principles defined herein may be applied to other embodiments without departing from the scope of the disclosure.

The exemplary Smart Panels of the present disclosure allow for adding remote access control and/or greater functionality to existing light switch wall box. In many buildings, the positioning of the light switch facilitates ease of access and convenience for connecting, powering, or operating various electronic devices, for example, IoT devices, smart home devices, thermostats, cameras, speakers, an intercom, interconnect ports (e.g. audio, video, power, or data cabling/interface/ports, for example, RJ45, CAT 5, 5e, 6, 6a, 7, HDMI, VGA, Display Port, USB, DVI, computer bus interface, speaker binding posts, etc.,) for connecting and/or power various electronic devices, virtual assistants (e.g. a voice operable AI device), system on a chip (SOC), Wi-Fi boosters or extenders, a touch interface control panel for controlling various other electronic devices, as well as many other devices. The Smart Panels may be electrically and/or communicably coupled, for example, the Smart Panel may be a speaker having an optical (or wireless) connection for attaching to a base unit or wall box.

Referring to FIGS. 1A-1F as exemplary Smart Panels 104a, 104b, 104c, 104d, 104e, 104f, 104g (hereafter referred to as 104a-104g) used in accordance with one or more exemplary embodiments of the present disclosure. An exemplary Smart Panel 104a-104g may be removably connected to a Smart Panel base module 101 through one or more connection slots 102 on the base module 101 as shown in FIGS. 1A-1F. In some exemplary embodiments, the base module 101 may include one or more electrical, magnetic, or physical attachment means to accommodate, secure, and connect one or more Smart Panels 104a-104g to the base module 101 and/or wall box 100. The Smart Panels 104a-104g may similarly include one or more connectors 103 for communicably coupling to the one or more connection slots 102 of the base module 101, and one or more attachment means for physically coupling to the base module 101. The Smart Panels 104a-104g and base module 101 attach to the wall box 100 and to the electrical wiring of the building.

The connection slots 102 may be recessed into the base module 101, connection slots 102 may be located within a recess of the base module 101. In some exemplary embodiments, connection slots 102 may be flush with the top surface of base module 101 and need not be formed as a recess in the base module 101, or positioned within a recessed area on the base module 101.

Several safety mechanisms are provided to secure the Smart Panels 104a-104g and prevent electrocution to user from attaching or detaching the Smart Panels 104a-104g from the base module 101. For example, an attachment mechanism 105 may be used to secure the Smart Panels 104a-104g in place to ensure electricity leaving the base module 101 only enters the connectors 103 of the Smart Panels 104a-104g through the connection slots 102. Another exemplary safety mechanism may include, for example, a retention mechanism 106 that may be used to prevent accidental removal of the Smart Panels 104a-104g. Moreover, when the Smart Panels 104a-104g are removed, the retention mechanism 106 may trigger connection slots 102 to become recessed, covered, grounded, insulated, or otherwise electrically non-conductive. The connections slots 102 may further be covered by a flap or recessed further down into a slot. As another example, spring lock leads 107 may be used to secure Smart Panels 104a-104g in place on the base module 101 to ensure electricity leaving the base module 101 only enters the spring lock leads 107. The spring lock leads 107 may be used alone or in combination with retention mechanism 106, attachment mechanism 105, and connection slots 102 to secure and electrical or communicably (e.g. optically) couple Smart Panels 104a-104g to base module 101. Similarly, the connection slots 102 may include a spring lock or other locking mechanism to secure and electrical or communicably (e.g. optically) couple Smart Panels 104a-104g to base module 101. Thus, connection slots 102 may be used alone or in combination with retention mechanism 106, attachment mechanism 105, and spring lock leads 107. Moreover, in some exemplary embodiments the connection (e.g. connection slots 102, retention mechanism 106, attachment mechanism 105, and spring lock leads 107) of the Smart Panels 104a-104g to the base module 101 may be through, for example, any combination of leads, pins, ball grid array (BGA) connection, or the like to minimize physical layout dimensions of the Smart Panels 104a-104g and the base module 101.

In some exemplary embodiments, the attachment mechanism 105 may be formed of a plurality of parts. One or more parts of the attachment mechanism 105 being formed on the base module 101 and one or more other parts being formed on the Smart Panel 104a-104g. The one or more parts of the attachment mechanism 105 facilitate a connection between the Smart Panel 104a-104g and the base module 101. The base module 101 connecting the Smart Panels 104a-104g to the building wiring and/or communication interface. Alternatively, the attachment mechanism 105 may be located only on, for example, the base module 101 or the Smart Panel 104a-104g.

The attachment mechanism 105 may have, for example, a rigid or pliable structure or membrane as a suitable interface for coupling and securing Smart Panels 104a-104g onto the base module 101. The attachment mechanism 105 may function together with the connection slots 102 to secure and hold the Smart Panel 104a-104g in place. The attachment mechanism 105 may be made of any combination of suitable metal, copper, rhodium, tin, silver, gold, iron, stainless steel, nylon, fiberglass, ceramic, piezo-ceramic, carbon, polycarbonate, plastic, glass, alloy, composite, Teflon, or fiber for coupling, fixing, retention, or adhering of Smart Panels 104a-104g to the base module 101. The attachment mechanism 105 may include magnetic panels, electrical leads, prongs, slots, or terminals for receiving and securing Smart Panels 104a-104g to the base module 101 and facilitating a physical electrical connection and/or wireless communication between the base module 101 and the Smart Panels 104a-104g.

In some exemplary embodiments, the release/retention mechanism 106 may be formed of a plurality of parts. One or more parts of the release/retention mechanism 106 being formed on the base module 101 and one or more other parts being formed on the Smart Panel 104a-104g. The one or more parts of the release/retention mechanism 106 facilitate a connection between the Smart Panel 104a-104g and the base module 101. The base module 101 connecting the Smart Panels 104a-104g to the building wiring and/or communication interface. Alternatively, the release/retention mechanism 106 may be located only on, for example, the base module 101 or the Smart Panel 104a-104g.

Moreover, the release/retention mechanism 106 and/or the base module 101 may include, for example, a retractable hook controllable through a safety notch or pin for decoupling one or more Smart Panels 104a-104g from the base module 101. The Smart Panels 104a-104g may be communicably connected to the base module 101 by pressing down on the release/retention mechanism 106 to retract the hook and to allow the Smart Panel 104a-104g to be attached to the base module 101. Once the Smart Panels 104a-104g are in place, the retractable hook springs back to lock the Smart Panels 104a-104g to the base module 101.

The release/retention mechanism 106 may have, for example, a rigid or pliable structure or membrane as a suitable interface for coupling and securing Smart Panels 104a-104g onto the base module 101. The release/retention mechanism 106 may function together with the connection slots 102 to secure and hold the Smart Panel 104a-104g in place. The release/retention mechanism 106 may be made of any combination of suitable metal, copper, rhodium, tin, silver, gold, iron, stainless steel, nylon, fiberglass, ceramic, piezo-ceramic, carbon, polycarbonate, plastic, glass, alloy, composite, Teflon, or fiber for coupling, fixing, retention, or adhering of Smart Panels 104a-104g to the base module 101. The release/retention mechanism 106 may include magnetic panels, electrical leads, prongs, slots, or terminals for receiving and securing Smart Panels 104a-104g to the base module 101 and facilitating a physical electrical connection and/or wireless communication between the base module 101 and the Smart Panels 104a-104g.

In some exemplary embodiments, the spring lock leads 107 may be formed of a plurality of parts. One or more parts of the spring lock leads 107 being formed on the base module 101 and one or more other parts being formed on the Smart Panel 104a-104g. The one or more parts of the spring lock leads 107 facilitate a connection between the Smart Panel 104a-104g and the base module 101. The base module 101 connecting the Smart Panels 104a-104g to the building wiring and/or communication interface. Alternatively, the spring lock leads 107 may be located only on, for example, the base module 101 or the Smart Panel 104a-104g.

The spring lock leads 107 may have, for example, a rigid or pliable structure or membrane as a suitable interface for coupling and securing Smart Panels 104a-104g onto the base module 101. The spring lock leads 107 may function together with the connection slots 102 to secure and hold the Smart Panel 104a-104g in place. The spring lock leads 107 may be made of any combination of suitable metal, copper, rhodium, tin, silver, gold, iron, stainless steel, nylon, fiberglass, ceramic, piezo-ceramic, carbon, polycarbonate, plastic, glass, alloy, composite, Teflon, or fiber for coupling, fixing, retention, or adhering of Smart Panels 104a-104g to the base module 101. The spring lock leads 107 may include magnetic panels, electrical leads, prongs, slots, or terminals for receiving and securing Smart Panels 104a-104g to the base module 101 and facilitating a physical electrical connection and/or wireless communication between the base module 101 and the Smart Panels 104a-104g.

The exemplary Smart Panels 104a-104g and base module 101 may be used to control existing light switches, ceiling fan controls, ceiling fixtures, light fixture controls, dimmers, sound, or motion sensor units, and conventional light switch receptacles. As shown in FIGS. 1A-1B, an existing wall box 100 with single unit or multi-unit switch may be replaced with a base module 101, and one or more Smart Panels 104a-104g. As shown in FIGS. 1A-1F, each Smart Panel 104a-104g may comprise of one or more modules 108, each exemplary module 108 of a Smart Panel 104a-104g may include electronic devices, touch screens, mechanical switches, touch sensitive switches, displays, graphical and/or touch interfaces, power connectors or connections, audio and video cabling/interface/ports, virtual assistant (e.g. a voice operable AI device), etc. For example, Smart Panel 104a-104g may comprise of one or more components, for example, a speaker, a microphone, and a camera.

The modules 108 may include a device for operating one or more electronic devices within a building or home. FIG. 1A shows three exemplary modules 108 (top, center, and bottom). The exemplary modules 108 may include a light switch at top module 108, a camera at center module 108, and a microphone/speaker at bottom module 108. In some exemplary embodiments as shown in FIGS. 1E-1F, each module 108 may have several integrated electronic devices, for example, the camera, microphone, speaker may be included in the top module 108, a touch interface, motion sensor, and dimmer may be included in the bottom module 108. In some exemplary embodiments as shown in FIG. 1B, the module 108 may include several swappable electronic devices that may function together or individually, for example, the top module 108 may include a thermostat, intercom, and display, while the bottom module 108 may include a virtual assistant, camera, and storage device that adds functionality and storage to top module 108.

One or more modules 108 may contain all the necessary hardware, software, and firmware to function as a standalone product, working independently of the base module 101. For example, the module 108, may be a camera, comprising of external and internal components necessary to operate as a camera, such as for example, a lens, a flash light source, a touch or graphical interface, microphone and speaker, a sensor, a controller, a processor, memory, storage, a network module, etc. However, modules 108 may contain some or all components, for example, necessary for operating as a camera, while delegating processing, storage, and network connectivity to the base module 101. Further, modules 108 may include interconnect cables or ports (e.g. media, power, or data cabling/interface/ports, for example, RJ45, CAT 5, 5e, 6, 6a, 7, HDMI, VGA, Display Port, USB, DVI, computer bus interface, speaker binding posts, etc.,) for coupling to various electronic devices.

Moreover, the one or more modules 108 may provide an interface for connecting, powering, or operating an electronic device wirelessly coupled to the base module 101 or coupled by wire to the base module 101 through interconnect cables or ports on the module 108. Thus, modules 108 may connect, power, or operate various electronic devices, for example, IoT devices, smart home devices, thermostats, cameras, speakers, an intercom, interconnect ports (e.g. audio, video, power, or data cabling/interface/ports, for example, RJ45, CAT 5, 5e, 6, 6a, 7, HDMI, VGA, Display Port, USB, DVI, computer bus interface, speaker binding posts, etc.,) for connecting and/or power various electronic devices, virtual assistants (e.g. a voice operable AI device), system on a chip (SOC), Wi-Fi boosters or extenders, a touch interface control panel for controlling various other electronic devices, as well as many other devices.

The one or more modules 108 may further include a sensor cover for covering the one or more sensors, wherein the processor instructs the sensor cover to move to cover the one or more sensors. For example, module 108 may include a sensor cover for covering a camera 358 of the Smart Panel 350 to provide for privacy. The controller 354 and/or the processor 302 may instruct the sensor cover to move to cover the one or more sensor component. Moreover, the sensor cover may also mechanically movable for covering the camera 358.

Moreover, as shown in FIGS. 1C-1D, conventional electrical wall boxes 100 (1-, 2-, 3-gang boxes, etc.,) may be replaced with smart wall box 120 or smart wall box 130. Smart wall boxes 120, 130 may include appropriate electronic components (e.g. a transformer, voltage converter/regulator, AC/DC or DC/DC power converter, or frequency converter, etc.), circuitry, and wiring 110 for quick and universal installation into existing electric wiring of a building or home. In some exemplary embodiments, the base module 101 may be embedded within the smart wall box 120, 130 for receiving modules 108 as shown in FIG. 1A and FIGS. 1C-1D. Moreover, as shown in FIGS. 1C-1D, the base module 101 and Smart Panels 104a-104g may be pre-installed and pre-wired within the smart wall box 120, 130 as a package for easy installation into the electrical wiring of a building or home by a contractor, electrician, professional installer, licensed professional, or the like. In some exemplary embodiments, where a convention electrical wall boxes 100 is replaced with base module 101 and Smart Panels 104a-104g, the base module 101 may include appropriate electronic components (e.g. a transformer, voltage converter/regulator, AC/DC or DC/DC power converter, or frequency converter, etc.), circuitry, and wiring for universal installation into existing electric wiring of a building or home.

The base module 101 may be fitted with various Smart Panels 104a-104g having one or more modules 108. For example, a light switch (not shown) and wall box 100 may be replaced with a smart wall switch 120, 130, base module 101, and Smart Panels 104a-104g having a light switch module 103. The base module 101 may be programmed by the user to operate as, for example, a light switch or ceiling fan. Once connected to the base module 101, the Smart Panel 104a-104g may provide identification information (e.g. device type, make, model, functionality list, id, etc.) to the base module 101 outlining a list of user operations and interactions. The Smart Panels 104a-104g may then be installed onto and electrically and/or communicably coupled to base module 101.

In some exemplary embodiments, the base module 101 may include appropriate electronic components (e.g. a transformer, voltage converter/regulator, AC/DC or DC/DC power converter, or frequency converter, etc.), circuitry, and wiring for quick and universal installation into an existing wall box 100. For example, the base module 101 may include a transformer module configured to provide any one of: DC voltage of 5V and current of 1 A, DC voltage of 5V and current of 2 A, DC voltage of 12V and current of 1 A, DC voltage of 12V and current of 2 A, and AC voltage of 24V and current of 1 A, etc. Moreover, the base module 101 can limit current draw from the electrical wiring (e.g. from a current of 9 A to a current of 2 A) in the building to reduce power consumption during peak hours, or to limit power consumption based on learned user habits, or user scheduling. The base module 101 may include a power supply module configured to connect to both 220V or 110V standards, and provide predetermined AC or DC voltages of between about 1V-48V or more, and between 1 A-48 A or more. The delivery of current and voltage to the one or more modules 108 may be filtered, regulated, limited or otherwise altered by the based module 101.

Moreover, Smart Panels 104a-104g and base module 101 may be removed from the wall box 100 to be repaired, replaced, and/or upgraded to a newer base module 101 with new software, firmware, storage, I/O, and hardware. The Smart Panels 104a-104g and base module 101 may be connected to a wireless access point, internet, Bluetooth, etc., to be modified, programmed, controlled, repaired, replaced, and/or upgraded with another base module 101 having the same or newer software, hardware, firmware, storage, I/O, etc. The Smart Panels 104a-104g and base module 101 may be made of any combination of suitable metal, copper, rhodium, tin, silver, gold, iron, stainless steel, nylon, fiberglass, ceramic, piezo-ceramic, carbon, polycarbonate, plastic, glass, alloy, composite, Teflon, or fiber, etc.

In some exemplary embodiments, the Smart Panel 104a-104g may be removable, fixed to, or preinstalled within a wall box 120, 130. The base module 101 and/or wall box 120 may connect to Smart Panels 104a-104g to provide wireless or wired communication, electrical power delivery, or signal transmission. As described above, the Smart Panel 104a-104g, one or more modules 108, wall box 120, 130, and base module 101 may serve as an all in one solution as shown in FIGS. 1C-1D. Smart Panels 104a-104g may include one or more modules 108 attached to, positioned on, or embedded within the housing of the Smart Panels 104a-104g. Thus, in the present disclosure, the terms Smart Panel 104a-104g (204, 350, etc.,) and modules 108 (208, etc.,) may be used interchangeably. In some exemplary embodiments, Smart Panels 104a-104g and base module 101 may be a single part or attachment, for example, a single switch box, combo box, outlet or receptacle. Moreover, Smart Panels 104a-104g may provide various functions such as a user control interface to manually control electronic devices 541, a USB data or power connection port, a wireless charging station, control of smart devices in a home or building, control of electronic devices in one or more rooms, etc.

FIG. 2 illustrates an exemplary embodiment of implementing the smart panel device 220 comprising a smart panel 204, one or more modules 208, base module 201, and wall box 230 of the present disclosure with some exemplary electronic devices 260, for example, smart light bulb 270a, smart thermostat 270b, virtual assistant 270c, smoke detector 270d, other light switches 270e (or other smart panel devices 220), light displays 270f, ceiling fan controllers 270g, smart doorbells 270h, one or more smart locks 270i, and biometric lock 270j, smart projectors/displays 270k, and the like. In the present disclosure, reference to Smart Panel device 220 need not be limited to any one particular component, and may refer to one or more of a smart panel 204, one or more modules 208, base module 201, and wall box 230.

The Smart Panel 204 includes a housing 207 that houses one or more modules 208, one or more cameras, speakers, and microphones, temperature, climate, and motion sensors, hardware, software, firmware, etc. In some exemplary embodiments, the Smart Panel 204 may include a controller 354 for wirelessly communicating with base module 201. As described above, the components (e.g. interface, hardware, sensors, software, firmware, etc.) need not be limited to the Smart Panel 204 and the base module 201, and may be distributed amongst the components of the Smart Panel device 220, for example, the wall box 230 or one or more modules 208 may include hardware, software, interface, etc., to perform all necessary functions of the Smart Panel device 220 or base module 201 of the present invention. While for ease of use and simplicity, and not by way of limitation, the components may be incorporated in the wall box 230 or base module 201.

The housing 207 and/or module 208 may include sensor components 354, a mechanical push button or switch, a display (not shown), and a touch sensitive (e.g. resistive, capacitive, optical, surface acoustic wave (SAW), ultrasonic, etc.,) touchpad for detecting fingerprints, finger presses, finger taps, or finger swipes. The one or more modules 208 may be used for operating the various electronic devices 260, and the like. The Smart Panel device 220 may operate, for example, electronic devices 260 based on detected motion, sound (e.g. voice signature), video (e.g. facial recognition), fingerprints, finger presses, finger taps, or finger swipes, or any combination thereof.

The housing 207 or base module 201 may include components to facilitate geofencing (e.g. Wi-Fi and Bluetooth) for authenticating and automating the process of unlocking a smart lock 270i, for example, when the user's wireless device 531 is within a proximity to a door. Moreover, geofencing by the Smart Panel device 220 may be used to communicate to electronic devices 260 to turn on, for example, smart lights 270a, lock smart lock 270i, or play music through built-in speakers or other audio devices or speakers (e.g. virtual assistant 270c). In some exemplary embodiments, these actions may be performed manually (e.g. toggling a mechanical button/switch and/or pressing on a touch sensitive touchpad) or triggered by various sensors; motion sensors 357, environment sensors 356, cameras 358, as well as other sensors 359 of the Smart Panel device 220.

The housing 207 and/or modules 208 may include a projector (e.g. dot matrix projector) that the user may configure to project onto the floor or installation wall a picture, a personalized greeting, a video, device information, navigation screens, menus, etc. The projector may also be used to project a keypad or input interface onto the installation wall above or below the Smart Panel device 220 for guests or individuals to enter input, a code, settings, etc., and to operate electronic devices 260. Additional sensors 228 (e.g. fingerprint or motion sensor, facial recognition cameras/sensors) and may be attached to the housing 207 to detect faces as well as finger presses over the projected keypad to detect the individual, the code entered, and fingerprints of a finger pressed on the sensor. The sensors 228 may extend up the edge of the housing 207 or be centered on housing 207 (e.g. the front face or top face of the housing). In some exemplary embodiments, the projector may be placed together with or combined with the sensor 228 so that a user can either using their fingerprint or enter a code through the keypad projection to operate an electronic device 260.

Figure 3:
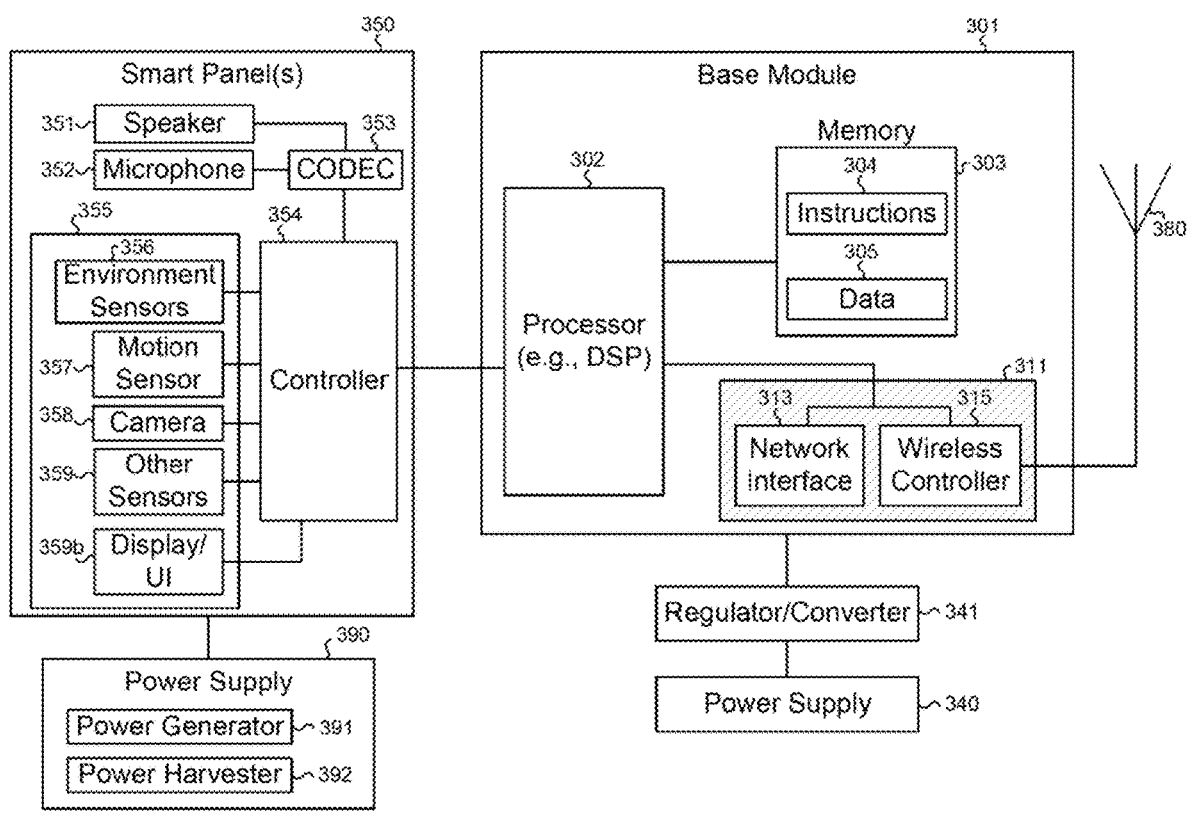
FIG. 3 illustrates an exemplary embodiment of the internal components of the Smart Panel system of FIGS. 1A-1C.

Similarly, the base module 201 includes a housing 202 that may house one or more sensor components (e.g. motion, sound, infrared, Bluetooth, Wi-Fi, etc.,) to collect user(s) or individual(s) presence or activity within a building as further described in FIG. 3. Moreover, the base module 201 may include other sensors for measuring insulation properties such as temperature, humidity, as well as electric/power usage, etc.

In some exemplary embodiments, the user accesses the Smart Panel device 220 directly to configure the base module 201, one or more modules 208, or the Smart Panel 204 using a Human to Machine Interface (HMI), for example, through firmware or software installed on the Smart Panel device 220 (i.e. base module 201, modules 208, or Smart Panel 204). For example, the Smart Panel device 220 or its components may be directly configured through software or application installed on a computing device (e.g. remote computing device 531) or through a web interface, or through one or more servers 511 communicably coupled to the Smart Panel device 220.

As an exemplary embodiment, the Smart Panel device 220 may collect data from various environmental activities in one or more rooms around a building and communicate the collected data to the base module 201. One or more Smart Panel devices 200 may be connected to one another forming a network, wherein collected information one or more rooms may be shared and distributed to other Smart Panel devices 200 or other remote computing devices 531 in a building. The base module 201 may then process the collected data and determine whether a user should be sent a notification, a video, an audio, a prompt to continue or cease monitoring specific activity, live view access, recorded video access, etc.

The Smart Panel device 220 and/or base module 201 may be communicably coupled to, for example and not limited to, one or more wireless user devices 280 through a router 200, one or more servers 290, or a peer-to-peer (P2P) connection. The Smart Panel device 220 and base module 201 may further be communicably coupled to one or more electronic devices 260 in a building through a hardwired or wireless network connection (e.g. through router 200).

The Smart Panel device 220 and/or base module 201 may each include a communication module 313 and/or wireless controller 315 to communicably couple an electronic device 541, electronic device 260, or the like, to a wired or wireless network, P2P network, etc.

The Smart Panel device 220 and/or base module 201 may send notifications or send user authorization through a server 511, however, data, audio and/or video may be sent by the base module 201 or Smart Panel device 220 through a peer-to-peer (P2P) network. The base module 201 or Smart Panel device 220 may connect directly to the user's remote computing device 531 or indirectly through a P2P coordinator using a wireless intermediate scheme such as radio frequency (RF), microwave, and the like. Those skilled in the art will recognize the base module 201 or Smart Panel device 220 may indirectly connect to the remote computing device 531 through multiple relay nodes such as access points, base stations, hubs, bridges, routers or other communication devices, not shown.

If a user acknowledges the event, the HMI may bring up the Smart Panel device 220 system application. The application may then connect directly to the base module 201 and/or Smart Panel device 220 to download (stream) the data, audio and/or video, to open 1-way or 2-way communication. The user may also be allowed to operate and electronic device 260 (e.g. open smart lock 270i) by giving control commands (e.g. lock/unlock or open/close) to the smart lock 270i through, for example, the Smart Panel device 220 HMI application. A separate secured connection (SSL/TSL over IP) may be established between the HMI application and the Smart Panel device 220 or base module 201.

In some exemplary embodiments, the Smart Panel device 220 may take audio commands from a user as input (e.g. through voice assistant software installed on base module 201 or module 208) for operating the one or more modules 208, base module 201, or electronic device 260. In some exemplary embodiments, the Smart Panel device 220 may take input from user finger gestures or fingerprint to operate the one or more modules 208, base module 201, or electronic device 260. In some exemplary embodiments, Smart Panel device 220 may learn from user behavior, access, and programming to operate one or more modules 208, base module 201, or electronic device 260 based on location or presence of one or more users.

FIG. 3 illustrates conceptually an exemplary Smart Panel device 350 with which some exemplary embodiments of the present disclosure may be implemented. The base module 301 may be any sort of electronic device that transmits signals over a network, such as electronic devices embedded in smart appliances and other smart systems. The base module 301 may include various types of computer readable media (e.g., a non-transitory computer-readable medium) and interfaces for various other types of computer readable media. The Smart Panel device 350 includes one or more modules 208 as shown in FIGS. 1-2, each of the one or more modules 208 may contain one, none, some, or all the components of Smart Panel 350 or base module 301 as described below and in the present disclosure.

Figure 4:
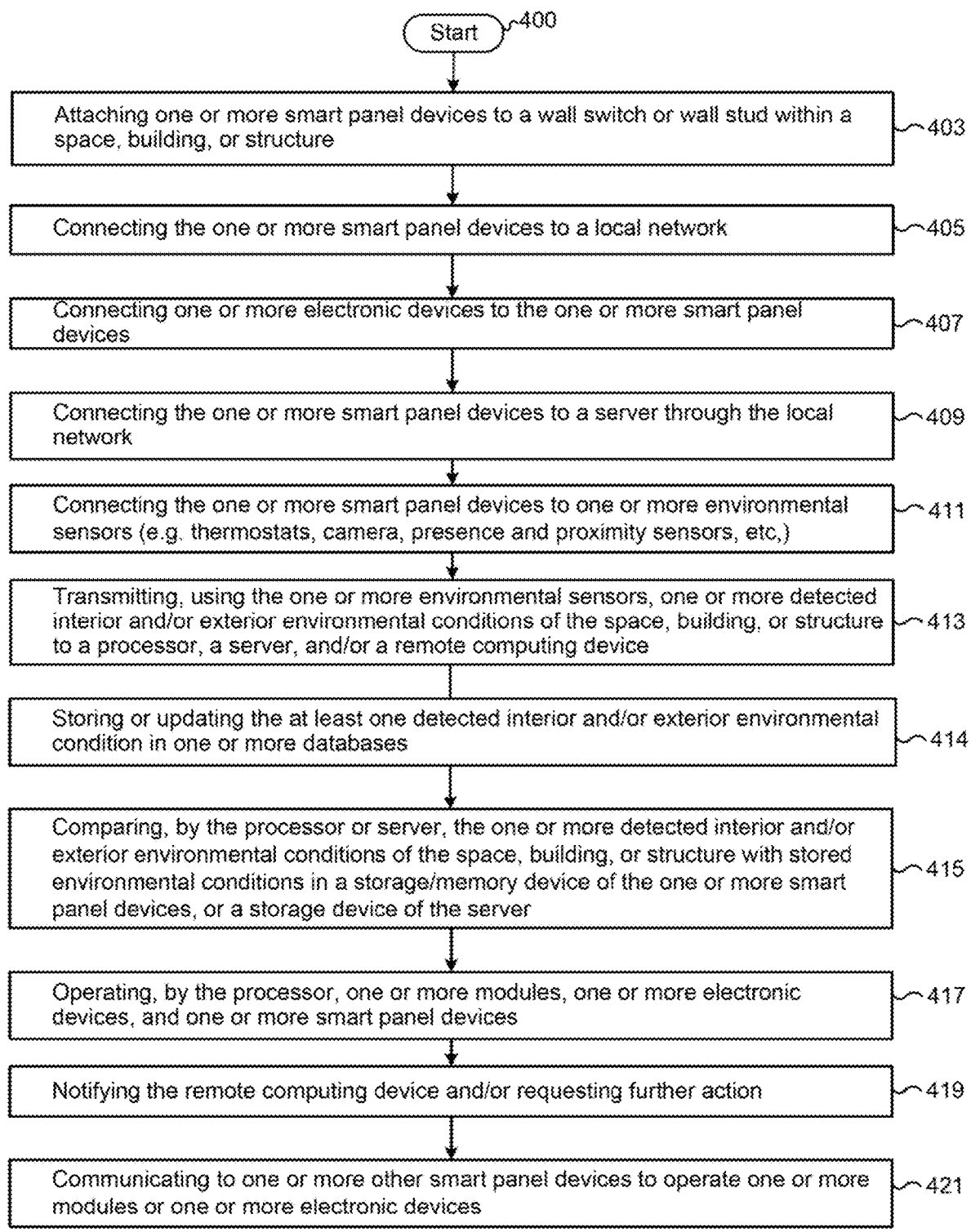
FIG. 4 illustrates an exemplary embodiment of a flowchart of interactions and operations of the Smart Panel system of FIGS. 1A-1C.
Figure 5:
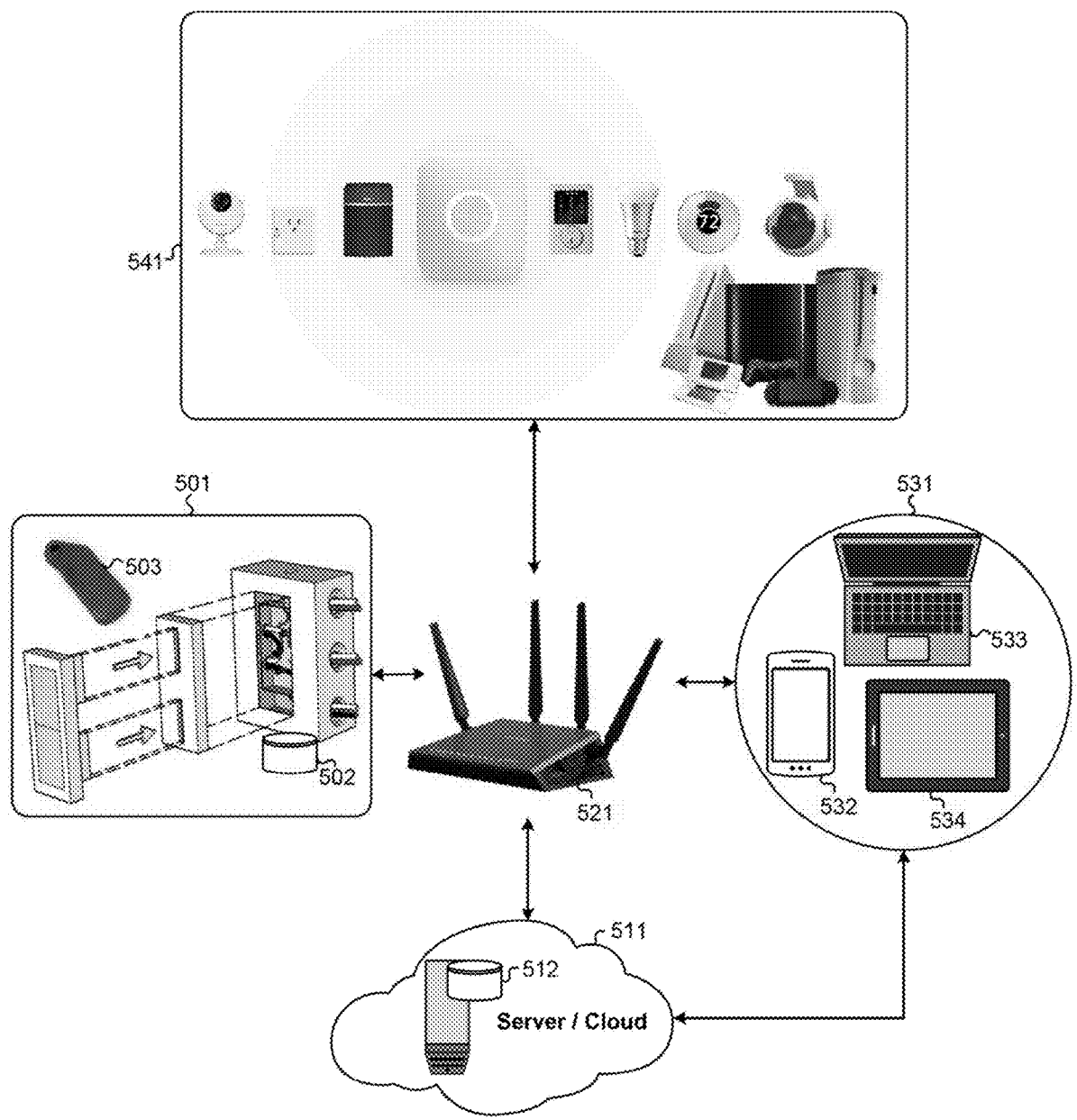
FIG. 5 illustrates an exemplary embodiment of the Smart Panel system of FIGS. 1A-1C communicating with other smart devices or remote computing devices.

The base module 301 includes a processor 302 and memory/storage 303. The processor 302 may retrieve and execute instructions 304 and/or data 305 from memory/storage 303 to perform the processes of the present disclosure. Processor 302 may be a single processor, a multi-core processor, or multiple processors in different implementations. Referring to FIGS. 4-5, instructions and data for operating base module 301 may be stored on, transmitted from, or received by any computer-readable storage medium (e.g., memory/storage 512 of server 511) storing data (e.g., data 305) that is accessible to a processor (e.g., the processor of server 511) during modes of operation of the base module 301. The base module 301 may access and execute instructions 304 and/or data 305 stored on any remote computing device 531. The data 305 may be a method instruction as depicted in FIG. 4. The method instructions are executable by processor 302, one or more servers 511, one or more electronic devices 541, one or more remote computing devices 531, or any combination thereof, where the instructions include steps on configuring and operating the Smart Panel device 350 and/or base module 301 and communication between user(s) and other remote, local, and/or wireless electronic devices.

The memory/storage 303 may include a dynamic random-access memory (DRAM) and/or a read-only memory (ROM). Memory/storage 303 may provide a temporary location to store data 305 and instructions 304 retrieved and processed by processor 302. Memory/storage 303 may include a non-volatile read-and-write memory that stores data 305 and instructions 304, even when Wi-Fi/Internet is off, that may be retrieved and processed by processor 302. For example, memory/storage 303 may include magnetic, solid state and/or optical media, memory/storage 303 may be a single or multiple memory units as necessary. The memory/storage 303 stores all collected visual, audio, textual, voice, motion, heat, proximity, etc. information provided directly from the Smart Panel device 350, or indirectly through a wireless connection to another electronic device(s), sensor(s), or sensor module(s) (e.g. local electronic devices 541).

Base module 301 couples to a network through a network interface 313. In some aspects, network interface 313 is a machine-interface. In this manner, the base module 301 may be a part of a network of computers, a local area network (LAN), a wide area network (WAN), or an Intranet, or a network of networks, for example, the Internet. A wireless controller 315 may be coupled to the processor 302. The wireless controller 315 may be further coupled to an antenna 380. The network module 311 may be integrated as system-in-package or system-on-chip device and/or collectively defined as having the network interface 313 and wireless controller 315. Network interface 313 and wireless controller 315 integrated into the network module 311 and being coupled to an antenna 380. Any or all components of base module 301 may be used in conjunction with the subject disclosure. The network interface 313 may include cellular interfaces, WiFi™ interfaces, Infrared interfaces RFID interfaces, ZigBee interfaces, Bluetooth interfaces, Ethernet interfaces, coaxial interfaces, optical interfaces, or generally any communication interface that may be used for device communication.

The Base module 301 and/or Smart Panel device 350 may use Narrow Band IoT (NB-IoT), Mobile IoT (MIoT), 3rd Generation Partnership Project (3GPP), enhanced Machine-Type Communication (eMTC), Extended Coverage GSM Internet of Things (EC-GSM-IoT) or other similar Low Power Wide Area Network (LPWAN) radio technology to enable a wide range of devices and services to be connected using cellular telecommunications bands.

The base module 301 is powered through a power supply 340. The power supply 340 may include disposable and/or rechargeable batteries (e.g. 2800 mAh rechargeable Li-Polymer battery), existing electrical wiring 110, a power supply adapter, or any combination thereof. The power supply 340 of base module 301 may also include an electrical generator, solar panels/cells or any renewable/alternative power supply source (e.g. wind turbine) as a primary or auxiliary source of power. Moreover, a converter/regulator 341; transformer or voltage regulator, AC to DC or DC to DC power converter, or frequency converter may be used separately (electrically coupled to the base module 301) or integrated within the base module 301 to provide adequate input power to the base module 301 (e.g. 12 VDC), Smart Panel 204, and one or more modules 208.

A Smart Panel device 350 may be communicably coupled to the base module 301. The Smart Panel device 350 may be coupled to base module 301, formed on base module 301, or remotely connected to base module 301. The Smart Panel device 350 may include and control various sensor components 355 for sensing environmental activity (e.g. temperature, sound, motion, and location of individuals, and their respective changes over time) within a proximity of a building. Sensor components 355 may monitor environmental conditions (e.g. humidity, temperature, rainfall) by using one or more environmental sensors 356, and individual activity by using one or more motion sensors 357, other sensors 359, and camera 358 and microphone 352.

A combination of sensor components 355 may be implemented to provide comprehensive monitoring or improved accuracy in monitoring environmental activity. Moreover, individual sensor components from Smart Panel device 350 may be separately coupled to base module 301 formed on base module 301, or remotely connected to base module 301. In some exemplary embodiments, some sensor components 355 may be grouped together to form a second or additional sensor modules. In certain embodiments, some sensor components 355 of Smart Panel device 350 (e.g. other sensors 359 or speaker 351 and microphone 352) may instead be formed on the base module 301. Further, in some exemplary embodiments, some sensor components 355 of Smart Panel device 350, for example, other (e.g. power) sensors 359 for monitoring power consumption may also be formed on the base module 301 to provide additional or supplemental monitoring.

Environmental sensors 356 may detect and collect information about environmental conditions around one or more buildings. Environmental sensors 356 may include, for example, temperature sensor, ambient light sensor, humidity sensor, barometer sensor, air quality sensor (e.g. for detecting allergens, gas, pollution, pollen, etc . . . ), infrared sensor, $CO_2$ sensor, CO sensor, piezoelectric sensor, airflow or airspeed sensor, and the like. The environmental conditions collected by environmental sensors 356 may be used by the processor 302 of the base module 301 in determining whether to notify a user (e.g. by wireless user device 532) or operate the Smart Panel device 350. Environmental sensors 356 may include, for example, a motion sensor, camera, and other sensors (e.g. proximity sensor, occupancy sensor, ambient light sensor). A microphone 352 may also be used to detect features or verify the opening or closing of entry door, or presence of individuals, or any type of environmental activity around a building.

The Smart Panel device 350 and/or base module 301 may store collected information from sensors 355, speaker 351, microphone 352, thermostat 441, remote computing devices 431, and server 411 in a database. The database may be stored on the storage 502 of the Smart Panel device 501, memory 303, on the storage 512 of a server 411, or on an application on a remote computing device 531. The space and individual information in the database is updated with the individual and space information acquired by the one or more sensors of a surrounding environment. A user or individual may be prompted to update or approve updating of the database with additional space and individual information acquired by the one or more sensors. The user or individual may further store user preferences in the database, the user preferences with specific instructions or actions based on collected space or individual information, scheduling, time of day, temperature, humidity, etc.

The space and individual information acquired by the one or more sensors is compared with user preferences stored in the database, the database may then be used by the Smart Panel device 501 to determine whether to connect, power, or operate various electronic devices, for example, controlling existing light switches, ceiling fan controls, ceiling fixtures, light fixture controls, dimmers, sound, or motion sensor units, and conventional light switch receptacles, IoT devices, smart home devices, thermostats, cameras, speakers, an intercom, interconnect ports (e.g. audio, video, power, or data cabling/interface/ports, for example, RJ45, CAT 5, 5e, 6, 6a, 7, HDMI, VGA, Display Port, USB, DVI, computer bus interface, speaker binding posts, etc.,) for connecting and/or power various electronic devices, virtual assistants (e.g. a voice operable AI device), system on a chip (SOC), Wi-Fi boosters or extenders, a touch interface control panel for controlling various other electronic devices, etc.

The Smart Panel device 350 (or one or more modules 208) may include a display 359b, for example and not limited to, a resistive touch display or capacitive touch display, a projector display, or other touch or pressure sensitive surface for receiving user input, etc. In some exemplary embodiments, other forms of interaction with The Smart Panel device 220, may be by user inputted commands through module 208 (e.g. display), microphone 352, wireless user device 280, one or more local electronic devices 260, remote computing devices 531, server 511, or any combination thereof.

The Smart Panel device 350 may include a controller 354 for controlling the sensors and processing data collected by the sensors. Controller 354 may include a processor, memory/storage device (storing sensor instructions, settings, etc.), and a network module wireless chip for communicating with base module 301. Controller 354 may send measured/detected environmental conditions and features to the processor 302 for further processing. In some exemplary embodiments, the Smart Panel device 350 may exclude the controller 354 and function as a sensor only device that transfers collected environmental activity around a building to the base module 301.

In some exemplary embodiments, the Smart Panel device 350 includes controller 354 to share or divide processing tasks or priorities of data, video, audio, or environmental sensor data with the base module 301. For example, the controller 354 may process certain motion (e.g. individuals, homeowners, pets or animals, etc.) or sounds (e.g. window or door closing or opening, window breaking) and sound an alarm, request verbal input from a user, or trigger an action instead of (or prior to) sending to base module 301 for further processing. Similarly, the base module 301 may process environmental activity prior to sending to a server 511 for further processing if necessary.

The Smart Panel device 350 may be powered by a power supply 390. The power from the power supply 390 may be provided by disposable and/or rechargeable batteries (e.g. 2800 mAh rechargeable Li-Polymer battery), existing in building electrical wiring, a power supply adapter, or any combination thereof. The Smart Panel device 220 may also be powered by solar panels/cells or any renewable/alternative power supply source (e.g. wind turbine) as a primary or auxiliary source of power. Disposable batteries or rechargeable batteries, for example, nickel cadmium (NiCd), lithium (Li), AA, AAA, and/or rechargeable capacitors, for example, supercapacitors (SC) or ultracapacitors. The power supply 390 may supply power to Smart Panel device 350 by, for example, a power adapter for connecting to an outlet, a solar panels/cell, or any other renewable/alternative power supply source. The Smart Panel device 350 may use multiple battery types, multiple power sources, etc., for example, using a coin cell battery to operate some sensor components or to provide auxiliary power to power and operate one or more modules 208 and/or one or more electronic devices 260 during brown outs, black outs, or other power outages. The one or more modules 208 of the Smart Panel device 220 may be plug-in charging ports, wireless charging ports, or re-chargeable battery charging ports for recharging, for example, Li/NiCd batteries.

In addition to being connected to existing electrical wiring of a building, the Smart Panel device 350 may include a power generator 391 and power harvester 392 as a power source. The power generator 391 may include rechargeable batteries, for example, nickel cadmium (NiCd), lithium (Li), AA, AAA, and/or rechargeable capacitors, for example, supercapacitors (SC) or ultracapacitors. The power generator 391 may comprise of multiple battery types, for example, using a coin cell battery to operate some sensor components or to provide auxiliary power, while using existing wiring to provide power for the Smart Panel device 350. Moreover, the power supply 390 may include a power harvester 392 such as wind turbines/electric generator or solar cells/panels for charging rechargeable batteries or capacitors to prolong primary and/or auxiliary power to supply power and operate one or more modules 208 or supply power to one or more electronic devices 260 during brown outs, black outs, or other power outages.

The Smart Panel device 350 may include a speaker 351 and microphone 352 for communicating with an individual or receiving control commands from an individual positioned within a vicinity of the base module 301. The speaker 351 and microphone 352 may be coupled to a CODEC 353. The coder/decoder (CODEC) 353 may also be coupled to the processor 302 through a controller 354. The processor 302 may provide audio information captured from the microphone 352 to any electronic device (e.g. server 511 or wireless user device 532) that may facilitate communication with an individual positioned within a vicinity of the base module 301 through the speaker 351.

In an exemplary embodiment, the base module 301 and/or Smart Panel device 350 comprises one or more motion sensors 357 for detecting motion information. For example, motion sensor 357 may detect moving objects and/or pedestrians. In some exemplary embodiments, the one or more sensors (e.g. motion sensor 357, camera 358, etc.) may be positioned along one or more edges of base module 301, for example, one or more of the four edges of the base module 101 as shown in FIGS. 1A and 1C. The motion sensor 357 may be a passive infrared motion detector. Infrared motion sensors are also known as PIR (passive infrared) motion sensors or simply PIR sensors. Such detectors have about a 120° arc and about a 50-foot range detection zone. In the case where an increased field of view of motion detection or more accurate motion detection is required, two or more motion detectors may be used.

Suitable alternate motion detectors may also be used, which as ultrasonic, optical, microwave, or video motion detectors. Additional alternative types of motion detectors may also be used to sense intrusion including laser scanning or frequency sensitive detectors, commonly referred to as "glass breaks". Motion sensor 357 may include image sensors having any type of low light level imaging sensors used for surveillance and unmanned monitoring in daylight to complete darkness, for example, low-light complementary metal-oxide-semiconductor (CMOS) or charge-coupled device (CCD) image sensors.

The motion sensor 357 may also be complemented with other devices to aid in detecting motion such as, for example, photocell sensors, cadmium-sulfide (CdS) cells, light-dependent resistors (LDR), and photoresistors. In addition to motion sensors, the photo cell sensors may be used to determine if there something in front of a sensor or a series of sensors that block light. The sensitivity of the motion sensor and photocell may be adjusted through, for example, an application on an electronic device (e.g. smart device 534 or laptop 531). Also, a server or application may decide if the situation or application warrants night use or twenty-four-hour operation of motion detection through alternate means such as photocell sensors. If night operation is selected, then the server or application will process detected photocell information to determine if motion was detected.

The Smart Panel device 350 may include any number of other or additional detectors or sensors, for example, other sensors 359. Examples of other sensors 359 that may be used include, by way of illustration only and not by way of limitation, temperature sensors, video cameras, audio recorders, motion sensors, ambient light sensors, light sensors, humidity sensors, smoke detectors, and other sensors, such as for example, an Electric Field Proximity Sensing (EFPS) sensor to determine whether a person or object is nearby that is behind a wall.

The Smart Panel device 350 may include a camera 358 for capturing visual information such as video and still images of the surrounding environment. The camera 358 may be coupled to a controller 354 for controlling the camera to capture visual information that may be sent to the processor 302. The controller 354 may be coupled to the processor 302 for processing visual information. The processor 302 may provide visual information captured from the camera 358 to any electronic device (e.g. server 511 or remote computing device 531) which may facilitate interaction or communication with a person or an object positioned within a vicinity of the base module 301. The camera 358 may be any optical instrument for recording or capturing images that may be stored locally, transmitted to another location, or both. The images may be still photographs, or sequences of images forming videos or movies. The camera 358 may be any type of camera, for example, high-end professional camera type, digital camera, panoramic camera, fish-eye lens type camera, multi-lens type camera, VR camera, etc.

The Smart Panel device 350 and/or base module 301 may provide an external audio feedback, for example, playing a greeting, audio message, or ringing a doorbell chime through the speaker 351 of the Smart Panel device 350. Moreover, the Smart Panel device 350 and/or base module 301 may provide an internal audio feedback, for example, ringing a digital or mechanical chime or greeting or message. The Smart Panel device 350 and/or base module 301 may communicate with one or more local electronic devices 541, remote computing devices 531, and servers 511 to provide one or more users with remote audio and/or visual feedback.

The base module 301 may include a plurality of terminals 110 and configured to connect to a plurality of electrical or communication (audio/video/data) wiring such that it may operate with 2-way, 3-way, 4-way switches as well as coupling to always-on devices. For example, a top module 104b configured as a switchable device (e.g. light switch), and the bottom module 104c configure as an always on device (e.g. thermostat). Similarly, the module 104a may be partitioned so that the top portion is a switch, middle portion is a camera/speaker/microphone, and the bottom portion is a sensor or thermostat. Thus, a contractor, electrician, or installer may run wiring or configure the Smart Panel device 350 and/or base module 301 for whatever switch, light fixture, ceiling fan, interface (Cat-5e/HDMI/USB), or module for operating another electronic device.

A Smart Panel device 350 may be communicably coupled to the base module 301. The Smart Panel device 350 may be coupled to base module 301, integrated with or formed on base module 301, or remotely connected to Base module 301. The Smart Panel device 350 may include and control various sensor components for sensing environmental conditions (e.g. temperature) and environmental features (e.g. location of furniture and individuals). Sensor components may monitor environmental conditions by using one or more environment sensors 356, and environmental features by using one or more condition sensors 355 (e.g. motion sensor 357, camera 358). A combination of sensor components may be implemented to provide comprehensive monitoring or improved accuracy in monitoring environmental features and conditions. Moreover, individual sensor components from Smart Panel device 350 may be separately coupled to base module 301, formed on base module 301, or remotely connected to base module 301. In some embodiments, some sensor components may be grouped together to form a second or additional sensor modules. In certain embodiments, some sensor components of Smart Panel device 350 (e.g. camera 358) may instead be formed on the base module 301. Further, in some embodiments, some sensor components of Smart Panel device 350 (e.g. camera 358) may also be formed on the base module 301 to provide additional or supplemental monitoring.

Condition sensors 355 may detect and collect information about environmental conditions in a subspace, space, building or structure. Condition sensors 355 may include, for example, temperature sensor, ambient light sensor, humidity sensor, barometer sensor, air quality sensor (e.g. for detecting allergens, gas, pollution, pollen, etc . . . ), infrared sensor, $CO_2$ sensor, CO sensor, piezoelectric sensor, airflow or airspeed sensor to determine air speed through HVAC system ducting and base module 301. The airflow or airspeed sensor may be used by the processor 302 of the base module 301 to determine how to control electronic device 541 (e.g. thermostat or smart register) to distribute airflow in a space.

Feature sensors 355 may detect and collect information about environmental features in a subspace, space, building or structure. Feature sensors 355 may include, for example, a motion sensor 357, camera 358, and other sensors 359 (e.g. proximity sensor, occupancy sensor, ambient light sensor). Microphone 352 may also be used to detect features or verify the opening or closing of doors or windows in a subspace, space, building or structure.

FIG. 4 illustrates an exemplary method of operating a smart panel device. These exemplary methods are provided by way of example, as there are a variety of ways to carry out these methods. Each block shown in FIG. 4 represents one or more processes, methods or subroutines, carried out in the exemplary method. FIGS. 1-3, and FIG. 5 show exemplary embodiments of carrying out the methods of FIG. 4 for collecting and processing information, for illustration purposes only, FIG. 2 may be used to illustrate the processes of the exemplary method. The exemplary method may begin at block 400.

Referring to FIG. 4, the exemplary method of using the smart panel device 220 (e.g. operation using environmental conditions) begins at block 400, followed by block 403 of attaching one or more Smart panel devices 220 to a wall switch (e.g. FIG. 1B) in a space, building, or structure. In some exemplary embodiments, the smart panel device 220 may be prepackaged (e.g. FIG. 1D) to be nailed onto the wall studs. Each Smart panel device 220 may be easily detachable from the window frame, and may include a detachable cover.

In block 405, the process continues with connecting one or more Smart panel devices 220 to a local wireless network through, for example, the network module 311 of the Smart panel device 220. The Smart panel device 220 may connect to a network of computers or remote computing devices 531, a local area network (IAN), a wide area network (WAN), or an Intranet, or a network of networks, for example, the Internet.

In block 407, the process continues with connecting one or more electronic devices to the one or more Smart panel devices 220 to provide the processor 302 with, for example, control of electronic devices, smart home devices, detected interior and/or exterior environmental conditions, etc. The one or more sensors of the smart panel module 350 may also be used to construct interior and/or exterior environmental conditions. The one or more sensors may be directly attached to, or detachably coupled to, the one or more smart panel modules 350 or smart panels 350. The one or more sensors of each Smart panel device 220 may be connected to form an array of detected environmental information (e.g. features and conditions) that may be provided to the processor 302.

In block 409, the Smart panel device 220 is connected to a server 511 through the local network connection. The processor 302 may use the network module 311 to establish and save a single connection or multiple means of connecting to the server 511 (e.g. using Wi-Fi, cellular connection, or by using any IEEE 802.11 standard). Moreover, a remote computing device 531 (e.g. smart phone, smart device, or portable device) may facilitate connection of the Smart panel device 220 to a server 511.

In block 411, one or more Smart panel devices 220 are connected to one or more environmental sensors. In some exemplary embodiments, environmental sensors (for collecting environmental features and/or conditions) may be provided by one or more other Smart panel devices 220, one or more modules 208, or one or more electronic devices 260 to transmit to a server 511 or smart panel device 501 through the local network connection. The processor 302 may use the network module 411 to establish and save a single connection or multiple means of connecting to the environmental sensors (e.g. using Wi-Fi, cellular connection, or by using any IEEE 802.11 standard). Moreover, a remote computing device 531 (e.g. smart phone, smart device, or portable device) may facilitate connection of the Smart panel device 220 to other environmental sensors. The Smart panel device 220 may communicate with environmental sensors to determine whether to turn on or off one or more lights, fans, smart home devices, modules 208, Smart panel devices 220, electronic devices 260, etc., through a single action (e.g. user initiated action), set of actions (e.g. an algorithm or program), or a list or blend of actions based one or more environmental conditions, a proximity of a remote computing device 531 or individual, a time of day, visual, motion, or audio information, a schedule, user(s) preferences, and the state of the Smart panel device 220, as described in the present disclosure.

In block 413, the process continues by transmitting, using the one or more sensors of the sensor module 350, at least one detected interior and/or exterior environmental condition of the space, building, or structure to the processor 302, server 511, or remote computing device 531. The sensors work together to detect, monitor, and transmit environmental conditions (e.g. sensors 355, 357, and 359 to detect and monitor interior and/or exterior climate).

In block 414, the at least one detected environmental condition is stored or updated in one or more databases. One or more databases may be used or created to store a category (e.g. time, room size, room name, season, power usage, peak usage times, inside and outside weather, user preferences, etc.) of detected environmental features and conditions, events, triggers, etc. The database store user behavior, user preferences, scheduling, and other settings based on user preferences. The databases may be stored on a storage/memory device 502 of the one or more Smart panel devices 220, or a storage device 512 of the server 511.

In block 415, the processor 302 or server 511 compares the one or more interior and/or exterior environmental conditions of the space, building, or structure with stored environmental conditions in a storage/memory device 502 of the one or more Smart panel devices 220, or a storage device 512 of the server 511.

In block 417, the process continues with the processor 302 operating one or more other Smart panel devices 220, one or more modules 208, or one or more electronic devices 260. Then, in block 419, the processor 302 and/or server 511 notify the remote computing device 531 (e.g. user) and/or request further action from the remote computing device 531.

In block 421, the one or more other Smart panel devices 220 communicate to another one or more other Smart panel devices 220, one or more modules 208, or one or more electronic devices 260 (e.g. to turn on a light, fan, virtual assistant, camera, etc.).

FIG. 5 illustrates an exemplary embodiment of Smart Panel system 501 (Smart Panel 204, one or more modules 208 and base module 201, with or without wall box 230) (hereafter "Panel system 501"). The Panel system 501 may comprise of Smart Panel 350, base module 301, and storage 502. In the following exemplary embodiments, the description of the Panel system 501 may refer to one of the devices, for example, the Smart Panel 350 notifying the user of an environmental activity or the base module 301 notifying the user of an environmental activity. Alternatively, the Panel system 501 may refer to the group of devices working together, for example, the Smart Panel 350 working together with notifying the base module 301 to notify the user of an environmental activity.

In some exemplary embodiments, the Panel system 501 may be linked through Wi-Fi, LAN, WAN, Bluetooth, two-way pager, cellular connection, etc., to a transmitter (e.g. more wireless user devices 280, or remote computing device 531). The Panel system 501 may learn user habits, patterns, and behavior by communicating with one or more local electronic devices 541, remote computing devices 531, and servers 511 through, for example, a wireless router 521.

The Panel system 501 may comprise of wirelessly communicating with one or more local electronic devices 541, remote computing devices 531, and servers 511 through, for example, a wireless router 521. The local electronic devices 541 may include, for example, IP cameras, smart outlets, smart switches, smart lightbulbs, smart locks, smart thermostats, video game consoles and smart TVs, smart blinds, garage door monitoring and controlling devices, smart refrigerators, smart washer/dryer, smart devices powered on solar energy, etc. and the like. The Panel system 501 may also connect to laptops 533, portable devices 534, wireless user device 532, and server 511 and/or server storage 512.

The Panel system 501 may collect, store, and process user habits, patterns, and behavior to predict and/or learn appropriate actions based on user interactions with the Panel system 501, electronic devices 541, remote computing devices 531, and servers 511. For example, the Panel system 501 may collect and process user interactions with, for example, the Panel system 501, server 511, transmitter (e.g. wireless user device 280) status and location, or user(s) interaction with electronic devices 541, or any combination of the above.

The Panel system 501 may communicate user interactions, habits, patterns, and behavior to a server 511, electronic devices 541, remote computing devices 531, or the like for further processing. For example, base module 301 may activate or operate Smart Panel 350 at certain times based on scheduling or user interaction to collect and process user interactions, habits, patterns, and behavior.

Moreover, user interactions may be cataloged or stored in one or more databases (e.g. Panel system storage 502, or server storage 512, etc.,) for mapping out user habits, patterns, and behavior to predict and/or learn appropriate actions and responses that may be taken by the Panel system 501, server 511, and/or communicated by the Panel system 501 or server 511 to one or more local electronic devices 541, or remote computing devices 531 for taking one or more appropriate actions.

For example, the Panel system 501 may notify a user of the location of the transmitter when a detected user activity conflicts with the status or location of the transmitter or with the user pattern or habit. The user activity may be collected by the Panel system 501 and/or one or more local electronic devices 541, or remote computing devices 531. For example, the Panel system 501 may notify a user by playing an audio message when the user leaves through the entry door forgetting to take their mobile phone with them in the morning.

In some exemplary embodiments, the Panel system 501 may include one or more communication modules for communicating wirelessly (e.g. Bluetooth, Wi-Fi, etc.,) with the base module 301, and/or with one or more remote computing devices 531, servers 511, local electronic devices 541, or any other electronic device mentioned above, to further improve efficiency in the Panel system 501.

Similarly, the base module 301 of the Panel system 501 may include one or more communication modules for communicating wirelessly (e.g. Bluetooth, Wi-Fi, etc.,) with one or more module 208 or Panel systems 501, and/or with one or more remote computing devices 531, servers 511, local electronic devices 541, or any other electronic device mentioned above.

The one or more communications modules may comprise of, for example, a basic low power communications module to communicate with the Smart Panel 350 or base module 301, and more robust or higher power communications module to communicate with other electronic devices, connect to the internet, or stream or distribute audio, visual, or motion information through a P2P or direct connection to other electronic devices. The data/audio/video sent by the Smart Panel 350 to the base module 301 may be sent as an uncompressed data/audio/video file, the base module 301 may then compress the audio/video file and send to a server 511.

The Panel system 501 may include a tamper-proof mechanism that may activate the Panel system 501 camera to record video and stream to one or more remote computing devices 531, servers 511, or local electronic devices 541 when the housing 207 or parts of the housing 207 (e.g. battery cover) is tampered with or damaged, and/or when entry door or windows are broken (e.g. opening of entry door or glass break sound detection).

Moreover, the Panel system 501 may include a night LED that may operate based on the time in the time zone of installation to provide better lighting conditions for collecting video at night and/or to provide a convenient night light function in the entryway to the building for the visitor or owner.

In some exemplary embodiments, the Smart Panel 350 or base module 301 may temporarily store data/video/audio in a storage module or Panel system storage 502 when the access point (e.g. router) loses internet connection, or when the Panel system 501 loses network connectivity.

Furthermore, in some exemplary embodiments, the Panel system 501 may be in a normally dormant state (e.g. ECO Mode, Sleep Mode, etc.,). For example, the Smart Panel 350 and/or base module 301 may be off or substantially off (e.g. low power mode) until motion, sound, or a finger press triggers the Panel system 501 to activate. Moreover, in some exemplary embodiments, housing 202 or housing 207 may include a resistive or capacitive touch sensor and fingerprint sensor formed on or outside of one or more modules 208 as a manual push button and fingerprint reader.

Once activated the Panel system 501 may attempt to use facial recognition or voice recognition to initiate an and audio or video intercom session. The Panel system 501 will collect the individual conversation or activity an entry door and send the communication as a live audio or video stream or recorded video clip or audio clip to one or more servers 511, remote computing devices 531, or local electronic devices 541, or any combination thereof. The communication will initiate a video or audio teleconference with a user, using the microphone 352, camera 358, and speaker 351. The video or audio teleconference may be terminated when the individual in front of the entry door leaves, or when the user terminates video or audio teleconference through, for example, an interaction with wireless user device 280 (e.g. finger press, eye motion, or other control command).

The Panel system 501 may be configured to wirelessly communicate and cooperate with local electronic devices 541 in real-time based on collected environmental activity or stored visual, motion, audio, and environmental information in Panel system storage 502 or server storage 512. The processor 302, controller 354, and/or server 511 may operate the Smart Panel 350 to play a digital or analog chime, a greeting, or collect environmental activity (e.g. video, audio, temperature, etc.,) to send to a computing device (e.g. base module 301, local electronic devices 541, remote computing devices 531, server 511, etc.,) based on triggered environmental activity as collected by the Smart Panel 350. The user may further define zones of activity for collecting information or triggering notifications for users, for example, a user may select or define areas or regions on an image or live video of the environment as collected by camera 358.

Other local electronic devices 541 (e.g. security camera, thermostat, smoke detector, smart lock, smart TV, etc.,) may cooperate with or supplement Smart Panel 350 sensors to provide comprehensive information of environmental activity around the building, or one or more zones around the building. In some exemplary embodiments, the security camera 541 may add additional monitoring (data, audio, or video) information to allow one or more Panel systems 501 to collect, filter out, or learn a tenant's activity around the building. In some exemplary embodiments, the Panel system 501 may use stored information in Panel system storage 502 or server storage 512 to determine whether to operate a local electronic device 541 or notify the user. Additionally, the Panel system 501 may use GPS or Bluetooth information from a remote computing device 531 (e.g. user's wireless user device) to determine whether to operate the doorbell chime.

The Panel system 501 may be configured to communicate between the above local electronic devices 541 (e.g. security devices, smart thermostat, smart devices, or smart appliances) by sending and retrieving proximity information, schedule information, textual (e.g. email, SMS, MMS, text, etc . . . ), visual, motion, or audio information, as well as user access information shared between electronic devices. For example, the Panel system 501 may be configured to be notified by these smart devices of exterior weather conditions, vehicle or user location, pedestrians, air quality, allergens/pollen, peak hours, etc. Notification may be made through text, email, visual, or audio information provided by remote computing devices 531, server 511, and/or local electronic devices 541 or any other electronic device mentioned above. Once a smart device (e.g. security camera 541) detects an individual, environmental activity may be relayed to the Panel system 501, then to a server 511 or remote computing device 531 for requesting or determining an appropriate response.

In this way, the Panel system 501 acts as a hub for collecting and processing environmental activity from other electronic devices then prompting the server 511 or remote computing device 531 for control instructions to play a digital or analog chime, message, video, or greeting, or collect environmental activity (e.g. data, video, audio, temperature, etc.,) to send to a computing device (e.g. base module 301, local electronic devices 541, remote computing devices 531, server 511, etc.). The Panel system 501 may also operate local electronic devices 541 based on user conditions or preferences. For example, if a user is approaching or leaving a home, the Panel system 501 may set electronic devices to home or away mode using one or more of: geolocation of wireless user device 531, motion or audio feedback to one or more Panel systems 501 or local electronic devices 541. The Panel system 501 may also be configured to first prompt a user or user(s) before enabling such functionality.

The Panel system 501 may be communicatively coupled to and controlled, programmed, or reprogrammed by local electronic devices 541 in the building, remote computing devices 531, or by one or more servers 511 to collect such data or collect additional data.

The Panel system 501 may also include a key fob 503 that a user may carry to operate local electronic devices 541 (e.g. smart lock or entry point devices 260). In some exemplary embodiments, the key fob 503 may be, for example and not limited to, a RFID card or RFID device that may be attached to a remote computing device 531. In some exemplary embodiments, the Panel system 501 may be programmed by the user to respond to the key fob 503 based on a schedule, geo-location of a user, user preferences, etc. Responses may include any combination of, operating one or more Panel systems 501, one or more entry point devices 260, operating local electronic device 541, and the like.

In some exemplary embodiments, the Panel system 501 may take a snapshot of the individual, processes facial features of the individual, and creates a digital photo id, digital access id, or the like, for imprinting on an access card, key card, or key fob. The access id may be a physical type of id (e.g. key fob) or a digital type of id (e.g. access through facial recognition). The building 100 may have an entry point device 260 (smart lock) that accepts key fobs or access cards created by the Panel system 501. In this way, the Panel system 501 may create physical access cards for entering through an entry door or garage. A miniature or portable printing device may be attached or built into the Panel system 501 for printing the snapshot of the individual to create the access card, key fob, or key card. To have access to the building, the individual may, for example, download an APP for the Panel system 501 or receive permission to access and download the APP through a text or email message. The individual may then provide personal information, for example, phone number, name, email, address, date of birth, driver license, social security number, etc., to verify their identity and receive authorization to access the building. Upon providing the personal information and receiving authorization, the Panel system 501 may verify the identity of the individual by taking a snapshot and sending a verification code to their remote computing device 531.

The Panel system 501 may use a shared IP or dedicated IP. The Panel system 501 having a fixed or static IP may benefit from numerous advantages, such as but not limited to, less downtime or power consumption from IP address refreshes, Private SSL Certificate, Anonymous FTP, Remote access, and access when the domain name is inaccessible.

The Panel system 501 may further be communicably coupled to one or more door sensors and window sensors. The door sensors and window sensors may notify the Panel system 501 in the event of a window or door opening, the Panel system 501 may then turn on and begin capturing audio and video of the event and concurrently or subsequently notify one or more local electronic devices 541, remote computing devices 531, servers 511, etc.

A remote computing device may be a smart device, a smart phone, a vehicle, a tablet, a laptop, a TV, or any electronic device capable of wirelessly connecting to a network or joining a wireless network. The remote computing device may be wirelessly and communicably associated to an individual either through a network or server (e.g. through a user account on the server, or WiFi™ login information), or through visual information collected by the SRV device. The terms remote computing device, individual, and user may be used interchangeably throughout the present disclosure.

The server may be a computer that provides data to other computers. It may serve data to systems on a local area network (LAN) or a wide area network (WAN) over the Internet. The server may comprise of one or more types of servers (e.g. a web server or file server), each running its own software specific to the purpose of the server for sharing services, data, or files over a network. The server may be any computer configured to act as a server (e.g. a desktop computer, or single or multiple rack-mountable servers) and accessible remotely using remote access software.

Proximity determination may be made by using a combination of visual, motion, and audio information. The sensor components or sensor modules, server, remote computing device, and/or Smart Panel system (Smart Panel and/or base module) may defined a virtual perimeter for a real-world geographic area. The Smart Panel system may also respond to geofencing triggers. Geofencing may be accomplished using location aware devices through, for example, GPS, RFID technology, wireless network connection information, cellular network connection information, etc. Visual, motion, and audio information may be collected by the Smart Panel system or server to substantiate an individual(s)/remote computing device(s) physical location.

The network may be a network of computers, a local area network (LAN), a wide area network (WAN), or an Intranet, or a network of networks, for example, the Internet. Moreover, various interfaces may be used to connect to the network such as cellular interfaces, WiFi™ interfaces. Infrared interfaces, RFID interfaces, ZigBee interfaces, Bluetooth interfaces, Ethernet interfaces, coaxial interfaces, optical interfaces, or generally any communication interface that may be used for device communication. The purpose of the network is to enable the sharing of files and information between multiple systems.

The term "within a proximity", "a vicinity", "within a vicinity", "within a predetermined distance", and the like may be defined between about 10 meters and about 2000 meters. The term "coupled" is defined as connected, whether directly or indirectly through intervening components, and is not necessarily limited to physical connections. The connection may be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but may have one or more deviations from a true cylinder. The term "comprising," when utilized, means "including, but not necessarily limited to"; it specifically indicates open-ended inclusion or membership in the so-described combination, group, series and the like.

The term "a predefined distance" may be defined as the distance of an approaching individual as the individual nears one or more Smart Panel systems, or a traceable object used in determining environmental features and/or conditions. The predefined distance may be defined as between about 1 meter and about 2000 meters.

The terms "predefined" or "predetermined" period of time may be defined to be between about 0.5 second to about 10 minutes.

The processor of the Smart Panel system, remoting computing device, or server may perform an action (e.g. first, second, third, etc . . . ) comprising of a single action, set of actions, or a list or blend of actions based on one or more of: a proximity of an individual(s) or remote computing device(s), a time of day, environmental activity and/or environmental features, visual, motion, or audio information, a schedule, user(s) preferences, and the state and settings of entry point devices, Smart Panel system, and local electronic devices, as described above. The action may be any one of: locking/unlocking the smart lock, operating smart lights, fully or partially opening one or more garage doors, ringing a digital smart doorbell chime, ringing a manual in-building mechanical or digital doorbell chime, operating a thermostat, smart TV, or other local electronic devices. The action may also include playing a music file, sound file, greeting, or message in response to a detected change in occupancy and/or environmental conditions and/or features, or in response to a detected or defined audio, proximity, visual, or motion trigger. The action may also comprise of controlling other smart devices as communicated through the Smart Panel system or server, for example, turning on a ceiling fan, outlet, and communicating with remote computing device(s) or detected individual(s). The action may also comprise of sending an email, text, or SMS to a server, smart devices, or remote computing device(s).

In response to any of the above actions, the action may also comprise of turning of the Smart Panel system and/or closing sensor cover for safety, privacy, or security. The server, user, remote computing device, or an electronic device may perform any action or series of actions to achieve convenience, safety, security, or privacy for the user, resident, or tenant.

Those of skill in the art will appreciate that the foregoing disclosed systems and functionalities may be designed and configured into computer files (e.g. RTL, GDSII, GERBER, etc.) stored on computer-readable media. Some or all such files may be provided to fabrication handlers who fabricate devices based on such files. Resulting products include semiconductor wafers that are separated into semiconductor dies and packaged into semiconductor chips. The semiconductor chips are then employed in devices, such as, an IoT system, the SRV device, or a combination thereof.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor, and the storage medium may reside as discrete components in a computing device or user terminal.

Further, specific details are given in the description to provide a thorough understanding of the embodiments. However, embodiments may be practiced without these specific details. For example, well-known circuits, processes, algorithms, structures, and techniques have been shown without unnecessary detail to avoid obscuring the embodiments. This description provides example embodiments only and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Where applicable, various embodiments provided by the present disclosure may be implemented using hardware, software, or combinations of hardware and software. In addition, where applicable, the various hardware components and/or software components, set forth herein, may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software or application, in accordance with the present disclosure, such as program code and/or data, may be stored on one or more computer-readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device. As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the present disclosure, the disclosure, the present disclosure, other variations thereof and alike are for convenience and do not imply that a disclosure relating to such phrase(s) is essential to the present disclosure or that such disclosure applies to all configurations of the present disclosure. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

The embodiments shown and described above are only examples. Many details are often found in the art such as the other features of an image device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed:

1. A smart panel device comprising:
   at least one memory;
   at least one module;
   at least one recess formed on a top surface of the smart panel device for receiving the at least one module;
   wherein a bottom surface of the at least one module contacts the top surface of the at least one recess, at least one side surface of the at least one module substantially fits within the recess, wherein the at least one module is communicably and detachably coupled to the smart panel device through the at least one recess, and wherein the smart panel device is directly connected to at least one building wiring to receive a first signal;
   wherein the smart panel device is communicably coupled to one or more electronic devices through the at least one module to transmit a second signal, wherein the one or more electronic devices are operable through the smart panel device;
- at least one or more interconnect ports, wherein the one or more interconnect ports communicably couple at least one of audio, video, data, or power to another one or more electronic devices;
- wherein the at least one module increases or decreases power consumption from the at least one building wiring based on at least one of: peak hours, learned user habits, or user preferences;
- a processor, coupled to the at least one memory, the processor is configured to cause a first action upon detecting a first activity; and
- a display configured to display at least one of the following: device identification information or notifications received from the at least one module, the one or more electronic devices, or both based on information detected from a surrounding environment.

2. The smart panel device of claim 1, further comprising a network module coupling the smart panel device to a local area network, wherein the smart panel device is communicably coupled to and receives instruction from at least one of a remote computing device, a server, or one or more other smart panel devices, and wherein the one or more interconnect ports communicably couple the at least one of audio, video, data, or power to the another one or more electronic devices through a wired connection or wirelessly through the one or more modules.

3. The smart panel device of claim 2, wherein the smart panel device comprises of at least one connector for detachably coupling the at least one module to the smart panel device.

4. The smart panel device of claim 3, wherein the smart panel device is configured to be attached to a wall box.

5. The smart panel device of claim 4, wherein the at least one module comprises a touch sensitive surface, and wherein user interaction with the touch sensitive surface transmits a control signal to the one or more electronic devices.

6. The smart panel device of claim 4, wherein the user interaction with the touch sensitive surface of the at least one module operates at least one of a light bulb, lighting fixture, or outlet.

7. The smart panel device of claim 6, wherein the at least one module comprises of at least one interconnect port for coupling at least one of an interconnect cable, power cable, media cable, or an electronic device to the smart panel device.

8. The smart panel device of claim 7, wherein the smart panel device further comprises a voltage regulator/converter for providing a predetermined current and voltage to at least one of the interconnect port and the at least one module.

9. The smart panel device of claim 5, wherein the at least one module is one of a video teleconferencing array module, system on a chip (SOC), Wi-Fi extender, thermostat, speaker, intercom, virtual assistant device, camera, motion sensor, temperature sensor, humidity sensor, or wind sensor, and wherein the one or more sensors acquire space information or individual information of the surrounding environment to enable image recognition technology, facial recognition technology, geolocation technology, or voice recognition technology.

10. The smart panel device of claim 9, wherein at least one of the one or more sensors is integrated within the smart panel device.

11. The smart panel device of claim 10, wherein the processor is configured to operate the one or more electronic devices based on instructions stored on the at least one memory.

12. The smart panel device of claim 11, further comprising one or more sensor covers for covering the one or more sensors and wherein the one or more sensor covers are configured by the processor.

13. The smart panel device of claim 9, wherein the first action comprises of collecting at least one of the geolocation information, visual information, audio information, and the environmental information.

14. The smart panel device of claim 13, wherein following the first action the smart panel device sends a notification alert, the visual information, the audio information, and the environmental information to the remote computing device.

15. The smart panel device of claim 9, wherein a combination of facial recognition technology, voice recognition technology and an ability to adjust the sensitivity of the one or more sensors enables the smart panel device to discriminate between the presence of a human being and other living beings.

16. A method comprising:
- detecting, by one or more sensors, an environmental condition;
- communicating the environmental condition to a smart panel device;
- communicably and detachably coupling at least one module to the smart panel device through at least one recess formed on the top surface of the smart panel device;
- wherein a bottom surface of the at least one module contacts the top surface of the at least one recess, and at least one side surface of the at least one module substantially fits within the recess;
- displaying, on the smart panel device, at least one of the following: device identification information or notifications received from the at least one module, the one or more electronic devices, or both based on information detected from a surrounding environment;
- communicably coupling one or more electronic devices to the smart panel device through the at least one module;
- wherein the smart panel device comprises of one or more interconnect ports;
- wherein another one or more electronic devices communicably couple to receive at least one of audio, video, data, or power through the at least one interconnect ports; and
- performing a first action, by the smart panel device, based on the detecting.

17. The method of claim 16, wherein the first action comprises of operating at least one of a light bulb, ceiling fan, lighting fixture, or outlet; and wherein the at least one of audio, video, data, or power is provided through a wired connection or wirelessly through the one or more interconnect ports.

18. The method of claim 17, wherein the first action further comprises attaching a device to the smart panel device and providing a predetermined current and voltage to the attached device.

19. The method of claim 17, wherein the attached device is at least one of a cable coupled to an electronic device.

20. The method of claim 19, wherein the smart panel device is communicably coupled to one or more smart panel devices, and wherein environmental condition comprises of at least one of a temperature, humidity, smoke, CO, $CO_2$, air particulate, ambient light, motion, barometer, infrared, airflow or airspeed information, and wherein the first action comprises of acquiring the environmental condition by at least one of the one or more smart panel devices or the one or more electronic devices, from at least an interior environment or an exterior environment.

21. The method of claim 20, further comprising of comparing the environmental condition acquired by the one or more smart panel devices to user preferences stored in a database prior to performing the first action.

22. The method of claim 21, wherein a user is prompted to approve of operating the one or more electronic devices.

23. The method of claim 22, wherein at least one of the one or more sensors is integrated within the smart panel device.

24. The method of claim 16, wherein detecting the surrounding environment utilizes at least one of image recognition technology, facial recognition technology, geofencing technology, or voice recognition technology.

25. The method of claim 16, wherein the first action comprises of acquiring at least one of the space information and the individual information of the surrounding environment; wherein the individual information comprises of at least one of the following: size, build, temperature, and number of individuals in the space, and wherein the space information comprises of at least one of the following: furniture type and location, smart panel device installation location, status and location of windows and doors, openings and cavities in the surrounding environment.

26. The method of claim 25, wherein the space information acquired by the one or more sensors is compared to a stored space information in a database.

27. The method of claim 26, further comprising of storing the space information acquired by the one or more sensors in the database; wherein the database is stored on a server or an at least one memory of the smart panel device.

28. The method of claim 27, further comprising of comparing the at least one of the space information to user preferences stored in the database prior.

29. The method of claim 28, wherein the space information in the database is updated with the space information acquired by the one or more sensors or one or more electronic devices, and wherein a user is prompted to approve updating of the database with the space information acquired by the one or more sensors.

* * * * *